Figure 2:
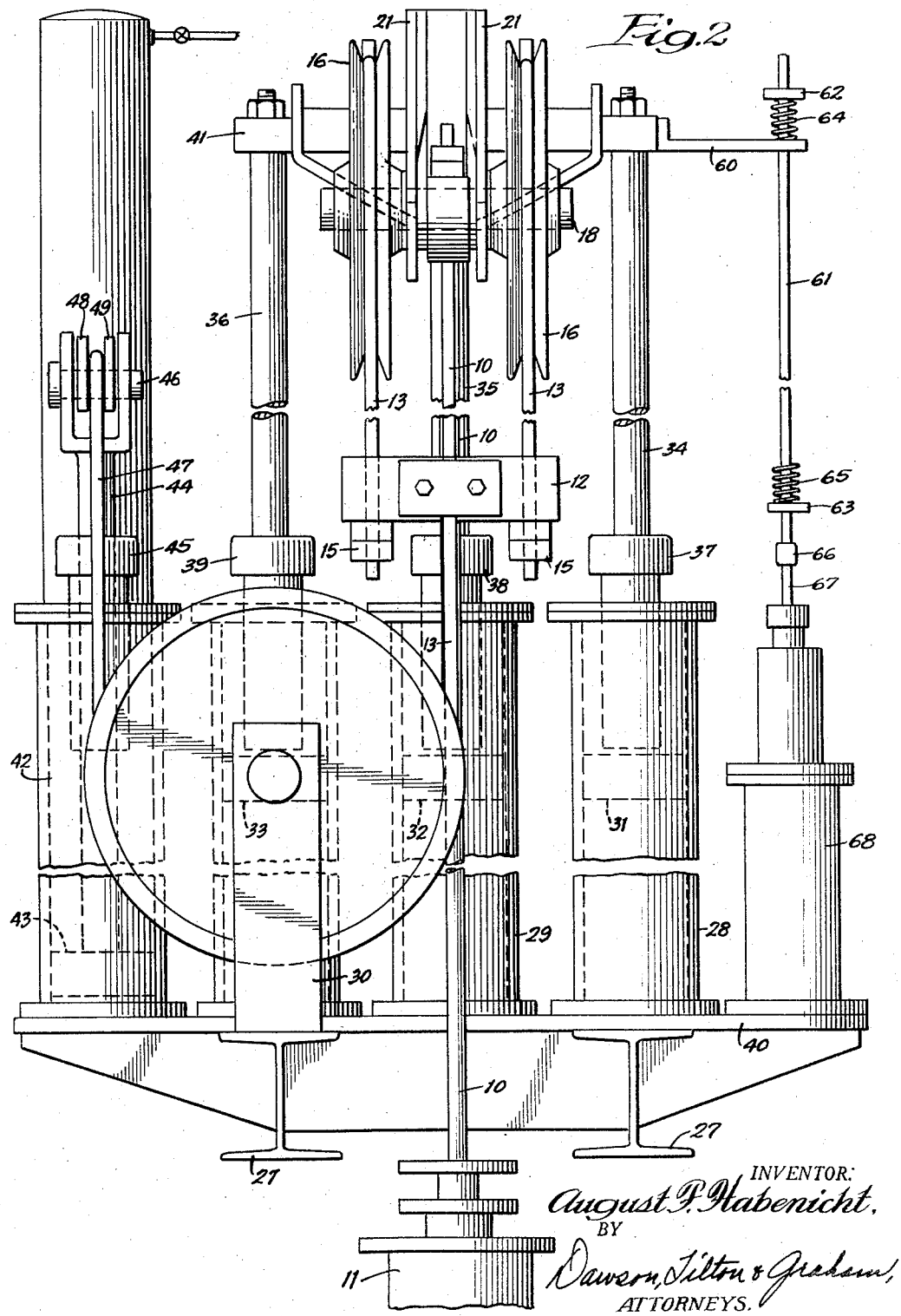

May 26, 1959  A. F. HABENICHT  2,887,846
HYDRAULIC POWER UNIT FOR DEEP WELL PUMPS
Filed Jan. 19, 1956  6 Sheets-Sheet 1

Fig. 1

INVENTOR:
August F. Habenicht,
BY
Dawson, Tilton & Graham,
ATTORNEYS.

May 26, 1959 A. F. HABENICHT 2,887,846
HYDRAULIC POWER UNIT FOR DEEP WELL PUMPS
Filed Jan. 19, 1956 6 Sheets-Sheet 3

INVENTOR:
August P. Habenicht,
BY
Dawson, Tilton & Graham,
ATTORNEYS.

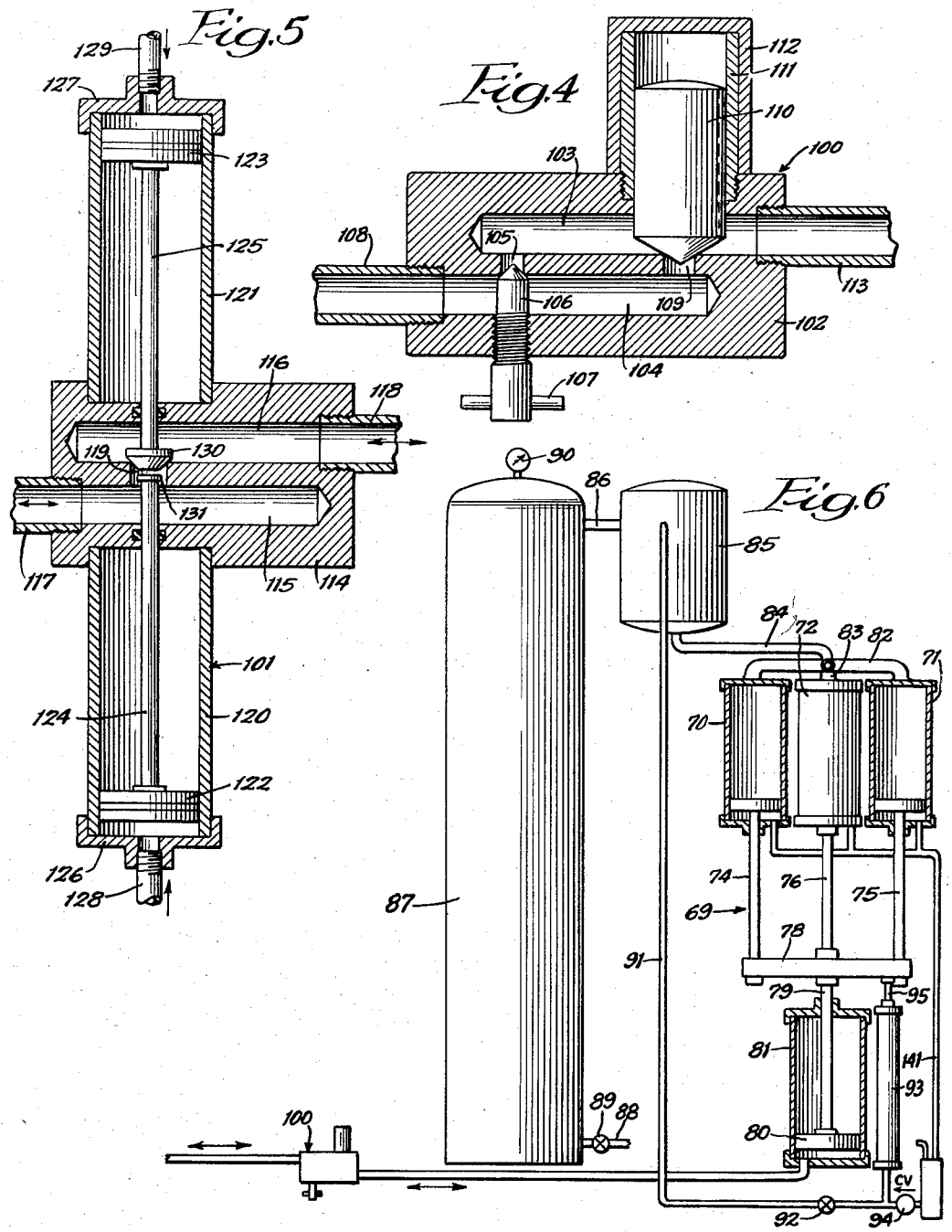

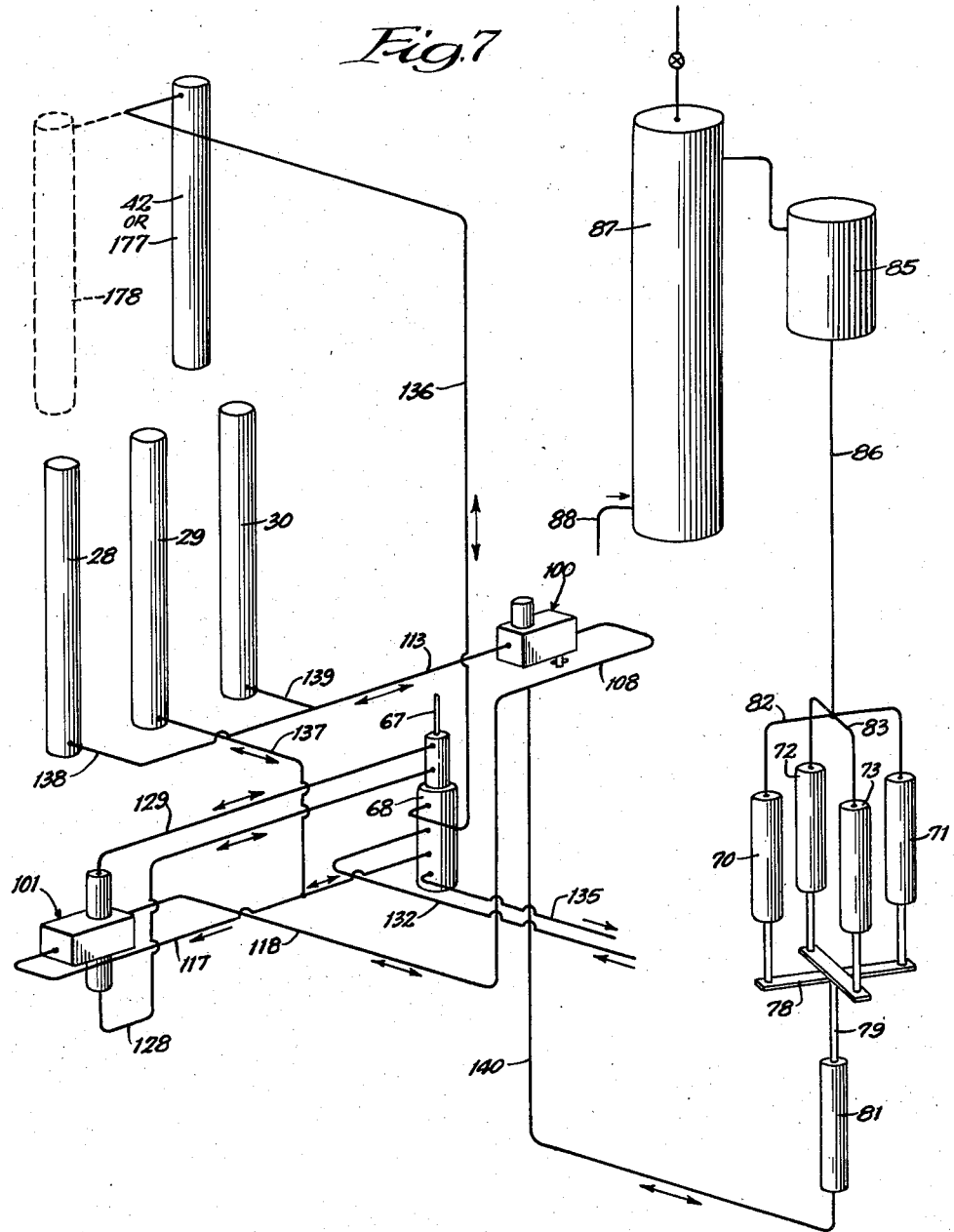

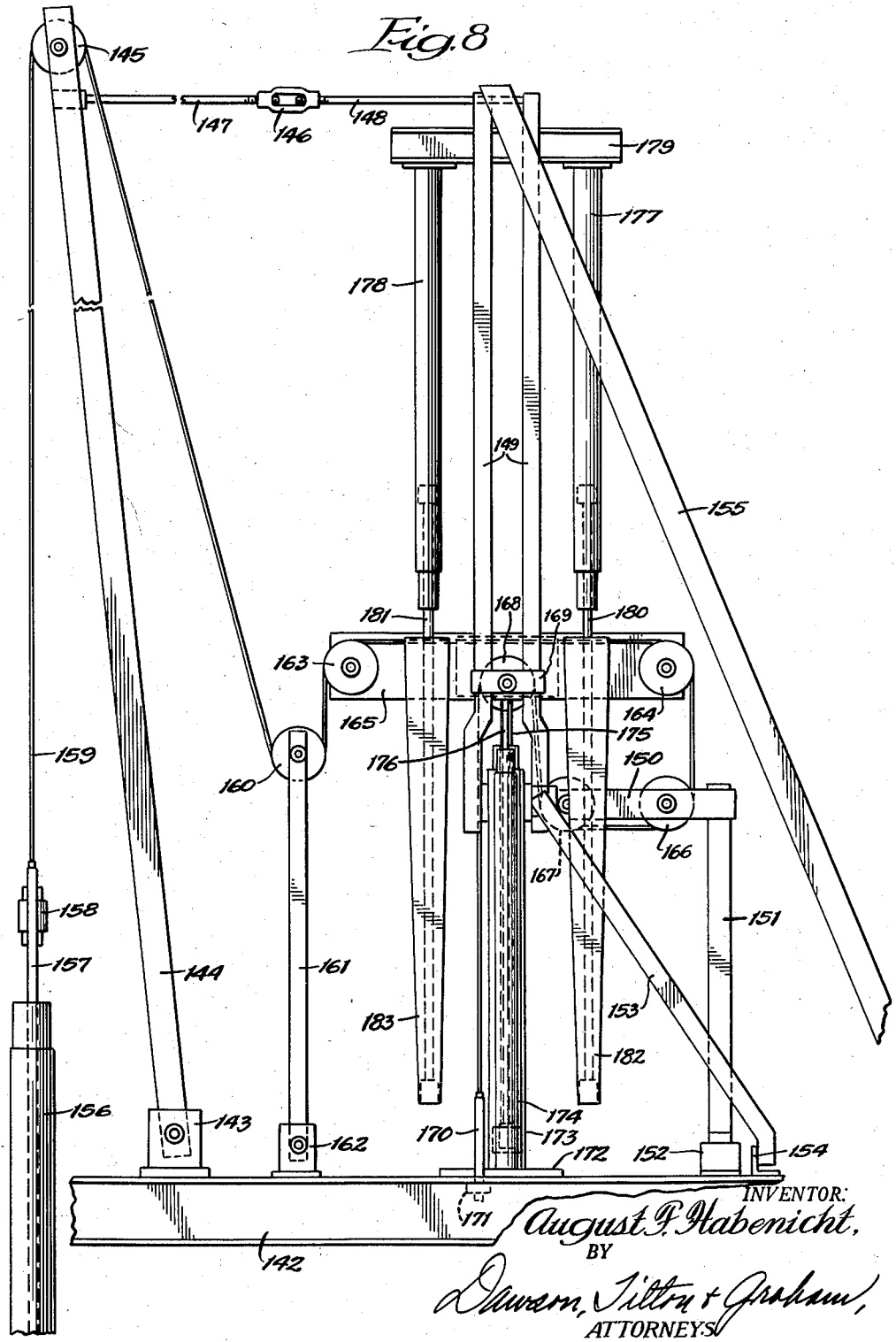

2,887,846

HYDRAULIC POWER UNIT FOR DEEP WELL PUMPS

August F. Habenicht, Tinley Park, Ill.

Application January 19, 1956, Serial No. 560,179

8 Claims. (Cl. 60—51)

This invention relates to a power unit actuated hydraulically, and more especially to a hydraulically actuated fluid pump. Apparatus embodying the invention is especially useful in pumping fluids from wells, and particularly in the pumping of liquid from deep wells.

In pumping liquids from wells, several different techniques have been employed, but the one used almost universally when wells commence to become relatively deep is to have a pump rod that goes down into the well, and the rod is reciprocated vertically by suitable apparatus to pump up the liquid from the well. The rod at the end thereof within the well is equipped with a suitable valve plunger, leather packing glands, etc., and the reciprocatory movement of the plunger is effective to pump up the liquid. Pumps of this character are well known and are employed, for example, in oil wells.

Whether a well is relatively shallow or quite deep, frequently extending downwardly to a depth of 5,000 feet, and often to a greater depth, there are a number of problems that are ever present. It may be noted, however, that the severity of the problems increases with the depth of the well. One of the difficulties encountered is that when the rod is at the bottom of its stroke, the weight of the rod, the weight of the fluid to be lifted during the upward stroke of the rod, and the frictional resistance to movement provided by the pump parts (the packing glands, for instance) combine to offer considerable inertia or resistance to upward movement that must be overcome by the power apparatus that reciprocates the rod. In conventional pumps, the full lifting force is instantaneously shifted from a downward direction to an upward direction when the rod is at the bottom of its stroke. The magnitude of this lifting force and its instantaneous application causes an elongation of the rod, and in time has the effect of tearing loose certain of the pump parts. Conversely, at the other end of the rod stroke, the instantaneous change from an upwardly directed lifting force to a downwardly directed return force may cause a buckling of the rod. Further, in actual practice it often happens that the rod in its downward movement causes the pump plunger to impact the bottom of the well, and it will be apparent that such results are injurious to the entire apparatus as well as to the foot pump within the well.

In efforts to overcome these problems, the practice has been to reduce the reciprocatory velocity of the pump rod, with the result that there is a greater length of time expended in changing the direction of movement of the rod at the bottom and upper ends of its stroke. This approach is disadvantageous for at least two reasons, one being that a greater amount of time must be spent in removing a given volume of fluid from a well. Secondly, there is a certain amount of leakage in the foot valve, especially around the packing glands thereof, and the amount of leakage is a function of time so that if a greater time is expended in lifting the fluid, a greater amount of fluid will be lost through leakage. Along this same line, it may be mentioned that it is an axiom in this art that the speed of movement of the pump rod must be decreased with each increase in the depth of a well when pump apparatus heretofore known is employed.

I have invented a hydraulic pump that is a considerable advancement over those known in the art and now in use, and that is one of the objects of my invention. Another object of the invention is in providing a hydraulic pump particularly suited for use with deep wells, and which is able to pump vastly greater volumes of fluid from a deep well in a given time. Still another object is in providing a hydraulic pump that has no practical limit to the depth to which a well may be driven, and which does not necessitate a decrease in the speed of movement of the pump rod in proportion to the depth of the well. Still another object is to provide a pump structure wherein a pump rod is not dropped to the lower extremity of its reciprocatory positions largely through the effects of gravity acting on the rod, but instead is moved downwardly by a positive downward force applied thereto. Yet another object is in hydraulic pump apparatus of the character described in which elongation and buckling of the pump rod is considerably minimized, if not completely avoided, and wherein the danger of the foot valve rod impacting stationary pump components at the bottom of the structure is avoided.

A further object is that of providing a pump in which a constant hydraulic pressure is provided in the system, but wherein the force initially exerted against the pump rod to change its direction of movement is relatively low and then increases rapidly in magnitude, particularly during the upstroke, so as to provide a continuous acceleration of the rod for a substantial portion of the upstroke thereof. Still a further object is in providing hydraulic pump apparatus wherein safety means are incorporated to prevent dropping of the pulp rod in the event that the power mechanism fails. Still a further object is to provide a hydraulic pump mechanism wherein the fluid pressures within the system are relatively low, whereby the apparatus is exceptionally safe. Yet a further object is in the provision of hydraulic pump apparatus of the character set forth that automatically accommodates a change in the character of the fluid being pumped from a well—as, for example, where a quantity of gas inadvertently enters the foot pump or valve within the well when the apparatus is intended to pump only liquid from the well.

Another object is in the provision of a hydraulic pump wherein the number of strokes in a given time interval of the pump rod may be increased manifoldly over the number of pumping strokes that can be accommodated by conventional pumping apparatus, and wherein a longer stroke length is provided at the same time. Still a further object is to provide a hydraulic pump having an air cushion that is effective to cushion or reduce in magnitude the force applied upwardly against a pump rod at the moment it reaches the lowermost position thereof in its reciprocatory movement, the cushioning means thereafter magnifying the upward force applied to the pump rod by feeding the force instantaneously absorbed thereby back into the system.

Yet a further object is to provide a hydraulic pump having a hydraulically actuated lift cylinder, the piston thereof being operatively connected with a pump rod for reciprocating the same, a return cylinder also having a piston operatively connected to the pump rod for moving the same downwardly, a source of hydraulic pressure fluid to be fed alternatively to the lifting and downstroke cylinders, and a valve and air cushion arrangement connected in the system in such a manner that on the upstroke of the lift cylinder, a portion of the hydraulic fluid feeds into the cushion to reduce the magnitude of the force applied to the lifting piston, and shortly thereafter feeds the energy back into the system to magnify the force applied to the lifting piston. Additional objects and advantages will become apparent as the specification develops.

Embodiments of the invention are illustrated in the accompanying drawings, in which—

Figure 3:
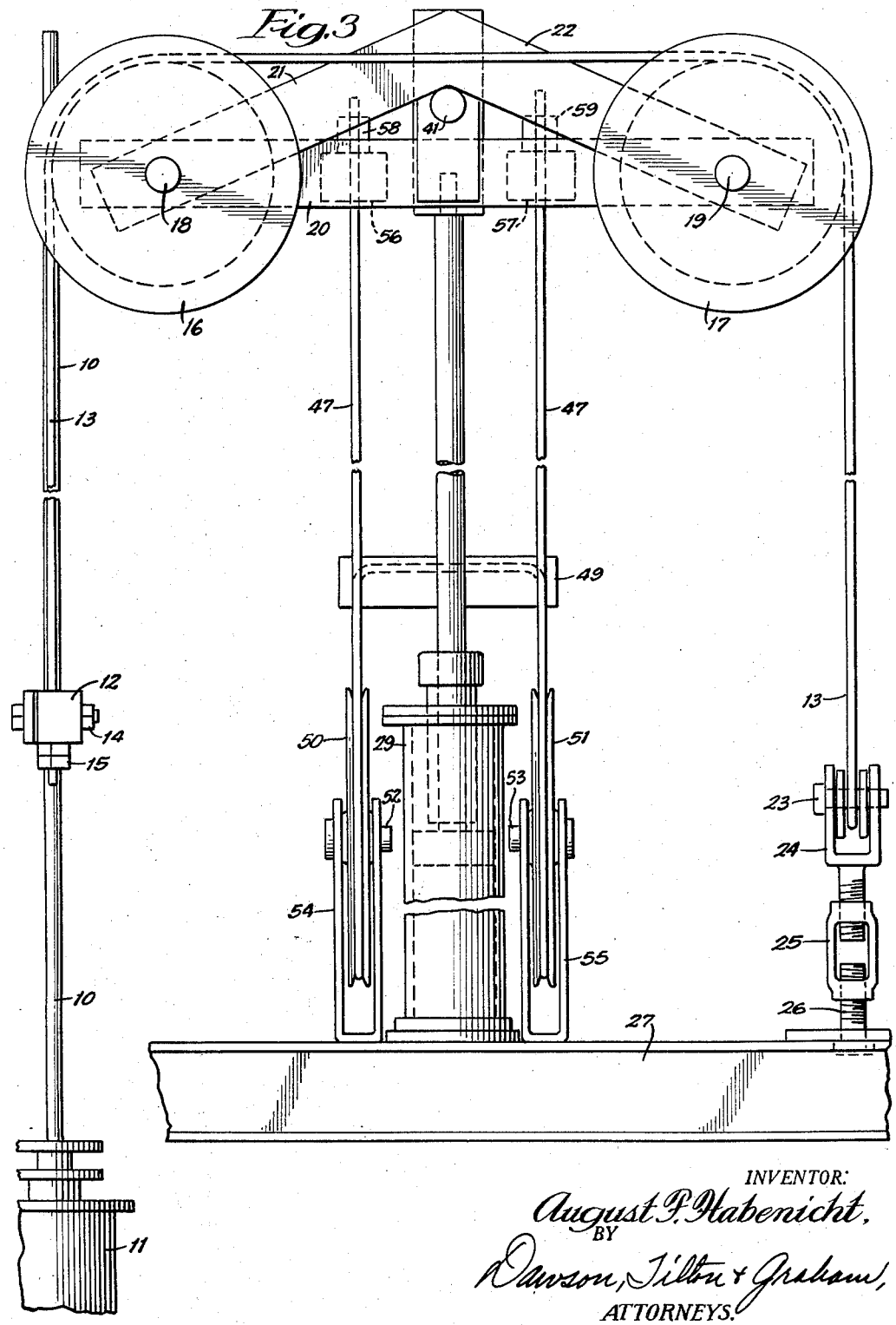

Figure 1 is a top plan view of the hydraulic apparatus for reciprocating a pump rod; Figure 2 is an end view in elevation of the apparatus illustrated in Figure 1, the view being taken from the left end of the apparatus as it is shown in Figure 1; Figure 3 is a broken longitudinal sectional view along the line 3—3 of Figure 1; Figure 4 is a sectional view of the retard valve employed in the system; Figure 5 is a sectional view of the cushion valve employed in the system; Figure 6 is a vertical sectional view through the cylinders comprising the cushion device of the system, and in which certain associated components are illustrated in elevation; Figure 7 is a diagrammatic view showing the hydraulic flow circuit for energizing the reciprocatory cycle of the pump rod; and Figure 8 is a broken side view in elevation of the apparatus showing a modified form thereof.

It is believed clear from what has been brought out hereinbefore that the apparatus comprising this invention is particularly suited for use in reciprocating a pump rod, and is shown in such an environmental setting. The apparatus or system is operative to reciprocate a pump rod which carries a foot valve or foot pump positioned within the depths of a well, and that when reciprocated functions to pump liquid from the well to the surface of the earth. Perhaps the showing in the drawings that is best for commencing a detailed description of the apparatus is Figure 3, and that figure illustrates in simplest form a pump rod and the primary components connected thereto that bring about its reciprocatory movement.

Referring then to Figure 3, it will be seen that a pump rod is illustrated on the left hand side thereof and is designated generally with the numeral 10. The rod 10 enters the casement 11 of a well, and at its lower end (not shown) which is located within the depths of the well is operatively connected with a foot valve or pump that draws liquid from the well in a conventional manner. Since arrangements of that character are well known in the art, a further description will not be set forth. Adjacent its upper end, but spaced some distance therefrom, the rod 10 is rigidly secured to a connector member 12 and extends therethrough. The member 12 in turn, on each side thereof is firmly anchored to the end of a cable 13. The fastener 12 for effectuating this coupling between the cables 13 and rod 10 may be of well known form and, for example, may be made rigid with the rod by a nut and bolt 14, and may be anchored to the cables 13 by the ferrule device 15.

The cables 13 ride in V-shaped grooves defined by sheaves 16 and 17 that are rotatably mounted, respectively, on shafts 18 and 19 carried adjacent opposite ends of a cross arm or bar 20, and at the same time are carried by the structural reinforcing angles 21 and 22. The cables 13 at the opposite ends thereof are each provided with an eye having extended therethrough a pin 23 received within a bifurcated upper end 24 of a turn buckle 25, that at its opposite end is threadedly secured to a stud 26 anchored in a support beam 27. By referring to Figure 2 and also to Figure 1, it will be apparent that a pair of sheaves 16 and a pair of sheaves 17 are provided, as well as a pair of cables 13.

In the functioning of the apparatus, the cross arm 20 is reciprocated vertically, and as it reciprocates the cyclic upward and downward movement of the sheaves 16 and 17 causes the cables 13, which are anchored at one end and connected to the rod at their other ends, to move upwardly and downwardly, thereby carrying the rod 10 therewith. The cross arm 20 is positively moved both upwardly and downwardly by apparatus that will now be described.

This apparatus comprises lift cylinders 28, 29 and 30, each of which is provided with a piston mounted for reciprocatory movement therein. For purposes of identification, the pistons are designated, respectively, with the numerals 31, 32 and 33. In turn, the pistons 31 through 33 are each equipped with a piston rod 34, 35 and 36, respectively, and surrounding these rods at their point of entry into the cylinders are the respective packing glands 37, 38 and 39. For purposes of distinguishing between the cylinders 28, 29 and 30, such distinction becoming important in describing the hydraulic circuit, the cylinders 28 and 30 may be thought of as counter-balancing cylinders, while the cylinder 29 will be designated as the primary lifting cylinder. The cylinders 28 through 30 are each rigidly secured to a cross beam 40 which, in turn, is carried by the support beams 27.

Each of the rods 34 through 36 is affixed at its upper end to a tie bar 41, preferably by reducing the upper end portion of each rod in diameter, threading it and securing a nut to the threaded end thereof after it is extended through an appropriate opening in the tie bar 41. Thus, the pistons of the cylinders 28, 29 and 30 reciprocate in unison and cyclically move the tie bar 41 upwardly and downwardly. As is most evident from Figure 3, the tie bar 41 is secured to the cross arm 20 so that upward movement of the pistons within the lifting cylinders is effective to move the cross arm 20 upwardly and, through the arrangement heretofore described, to move the pump rod 10 upwardly.

The pump rod is not permitted to move downwardly under its own weight whereby a free fall would result, but instead means are provided which prevent the rod and the pistons of the lifting cylinders from moving downward freely. Rather, a positive downward force is applied to move those pistons downwardly, and to effectuate downward movement of the pump rod 10. Such movement is afforded by a return or downstroke cylinder 42 having a piston 43 mounted for reciprocatory movement therein. The piston is equipped with a rod 44 having a packing gland 45 arranged thereabout at the point where the rod reciprocates through the upper closed end of the cylinder 42. The return or downstroke cylinder 42 is rigidly secured to the cross beam 40, as are the lifting cylinders.

At its upper end, the rod 44 of the return piston is bifurcated and has a pin 46 extending therethrough and a cable 47 connected therewith that, as is shown best in Figures 1 and 3, extends outwardly therefrom in opposite directions through a channel defined by a pair of spaced apart, elongated block members 48 and 49, and the cable is then entrained about sheaves 50 and 51 rotatably mounted, respectively, on shafts 52 and 53 that are supported within the spaced apart legs of the respective support brackets 54 and 55 rigidly secured to the support member 27. The free ends of the cable 47 are anchored to the cross arms 20 by means of the respective anchor members 56 and 57 affixed thereto. If desired, the free ends of the cable 47 may carry ferrules 58 and 59 to effectuate the connection with the members 56 and 57. The cable arrangement is such that when the piston 43 of the return cylinder is pushed upwardly, the cable 47 at the opposite end thereof exerts a downward force on the cross arm 20 to cause the same to move downwardly. Thus, a positive downward force returns the pump rod 10 to its lowermost position in its path of reciprocatory movement.

The cable and sheave arrangement provided for coupling the return stroke piston to the cross arm 20, and the cable and sheave arrangement provided for connecting the pump rod 10 with the cross arm 20, are simple mechanical arrangements for magnifying the upward and downward forces applied to the cross arm 20. That is to say, they provide a mechanical advantage; and by employing the desired number of sheaves, any desired mechanical advantage may be attained. Such arrangements are well known and their functioning then will be apparent to those skilled in the art.

Referring now to Figure 2, it is seen that the tie bar 41 that joins the rods 34, 35 and 36 of the lift pistons together, at one end thereof is provided with an arm 60 extending laterally therefrom, and that arm has an opening therethrough that slidably receives a shaft 61 having affixed thereto at spaced apart points collars 62 and 63. On the inner sides thereof, the collars provide a seat, respectively, for coil springs 64 and 65 that are adapted to be brought into engagement with opposite sides of the arm 20.

The shaft 61 through a coupling member 66 is joined with the outer end of a rod 67 that provides a control and a means for changing the condition of, and between, a plurality of flow ports with which a main control valve 68 is equipped. The valve 68 is operative so as to change the flow path of hydraulic fluid in the hydraulic system upon a change in the position of the control rod 67 from an up to a down position, and vice versa. The rod 67 is moved upwardly when the lift pistons approach the uppermost point of travel in their upward movement, since such movement through the tie bar 41 brings the arm 60 into engagement with the spring 64 which through the collar 62 and shaft 61 draws the control rod upwardly. Conversely, when the arm 61 is moved downwardly, it is ultimately brought into engagement with the coil spring 65, and through the collar 63 and shaft 61 the control rod 67 is moved downwardly. The control valve 68 will not be described in greater structural detail, for it is known in the art and is described in detail in Patent No. 2,422,895 which issued to me June 24, 1947. The valve 68 is rigidly secured to the cross beam 40 and, as will be apparent from Figure 1, the three lift cylinders, downstroke cylinder and valve are in alignment with each other and extend transversely across the pump apparatus.

Another important cylinder and piston arrangement that is provided in the hydraulic flow system may be designated generally as a cushion, and is shown in greatest detail in Figure 6. Numerically, the cushion is indicated generally by 69. The cushion 69 comprises a plurality of cylinders, there being four in number (see Fig. 1), and these are designated with the numerals 70, 71, 72 and 73. Each of the cylinders is provided with a piston mounted for reciprocatory movement therein, and each of the pistons has a rod extending downwardly through the cylinder casing, and the rods are designated, respectively, with the numerals 74, 75, 76 and 77. All of the rods are rigidly secured at their lower ends to a tie bar 78, and that member in turn is rigidly secured to the rod 79 of a piston 80 mounted for reciprocatory movement within the cylinder 81. It will be appreciated that when hydraulic fluid exerts an upward force against the piston 80, the tie member 78 will be forced upwardly, as will all of the pistons within the cylinders 70 through 73.

The cylinders 70 through 73 are all interconnected at their upper end through manifold sections 82 and 83 that, in turn, are connected to a flow conduit 84 communicating with a tank 85 that, through a flow conduit 86, communicates with an air storage tank or air reservoir 87. At its lower end, the tank 87 is adapted to be connected to an air compressor through a conduit 88 provided with a manually operable on/off valve 89. At its upper end, the tank 87 may be provided with a safety valve 90 that, if desired, may have a gauge associated therewith to designate the air pressure within the tank.

The smaller tank 85 also communicates through conduit 91, having an on/off valve 92 interposed therein, with a pump cylinder 93, and at the same time with atmosphere through a check valve 94. The cylinder 93 is provided with a piston reciprocable therein equipped with a piston rod 95 secured to the tie member 78. Thus, as the tie member is reciprocated, the piston within the cylinder 93 is also reciprocated.

Again referring to Figure 1, it will be apparent that the hydraulic flow system has a hydraulic pressure pump 96, the shaft of which is equipped with a pulley wheel or sheave 97 adapted to be connected to a belt drive connected to a motor or other prime mover which will rotate the sheave and the pressure pump connected thereto. The pump 96 is fed through a conduit 98 from a hydraulic storage tank or reservoir 99; and since a closed system is provided, all of the hydraulic fluid drawn outwardly from the reservoir by the pressure pump is ultimately returned thereto in a manner that will be described hereinafter.

Before the operation of the apparatus is described in terms of the complete hydraulic flow circuit, it is believed that it will be beneficial to described two additional components that play an important function in the operation thereof. These components are illustrated, respectively, in Figures 4 and 5, the one shown in Figure 4 being designated with the numeral 100 and may be referred to as a retard valve. The other, which is illustrated in Figure 5, is designated generally with the numeral 101 and may be considered a back flow control or cushion valve.

The retard valve 100 has a casing 102 that is provided with a pair of generally parallel flow passages 103 and 104 extending longitudinally therein; neither, however, extending completely through the casing, and each extending inwardly thereinto from opposite ends. The passage 103 communicates at its inner end with the passage 104 through a port 105 that is controlled by needle valve 106 threadedly received within the casing 102, and at its outer end having a handle portion 107 to facilitate turning the needle valve to adjust its position with respect to the port 105, and thereby establish the opening that will be provided through that port. The outer end of the flow passage 104 is in open communication with a conduit 108.

The inner end of the flow passage 104 communicates with the passage 103 through a valve port 109 that is controlled by a valve 110 in the form of a plunger or piston that is reciprocable within a cylinder or sleeve 111 carried interiorly of a shield or casing section 112. The outer end of the passage 103 is in open communication with a flow conduit 113. The weight valve or plunger 110 serves as a check valve that prevents the flow of fluid downwardly through the valve port 109 so that when hydraulic fluid flows through the conduit 113 and into the passage 103, it is metered by the needle valve 106 in its path of travel to the conduit 108. On the other hand, when fluid flows inwardly to the passage 104 from the conduit 108, it may flow upwardly into the passage 103 by the needle valve 106, and at the same time is effective to lift the weight valve 110 free of the seat or valve port 109 so that a large volume of hydraulic fluid may flow through that port in a short time.

The cushion valve 101 is provided with a valve casing 114 having a pair of generally parallel passages 115 and 116 extending longitudinally therein from opposite ends of the casing. The passage 115 at its outer end communicates with a conduit 117, while the passage 116 at its outer end communicates with a flow conduit 118. The passages are in open communication with each other through a valve seat or port 119.

Opposed to each other, and extending outwardly from the casing 114, are a pair of cylinders 120 and 121 that are equipped, respectively, with pistons 122 and 123 having connected therewith piston rods 124 and 125. At their outer ends, the cylinders are provided, respectively, with end walls or caps 126 and 127 having flow passages therethrough that communicate, respectively, with conduits 128 and 129.

At its inner end, the piston rod 125 carries a valve 130 adapted to be brought into seating relation with the port 119 to close off the same. The valve 130 is adapted to be operatively connected with the rod 124 which is provided at its inner or upper end with a button or flange 131.

The port 119 is closed when the valve 130 is in seating engagement therewith, which is the condition illustrated in Figure 5. This condition prevails when the pressure behind the piston 123 exceeds that behind the piston 122. The port is adapted to be opened to permit the flow of fluid from the conduit 117 to the conduit 118 when the pressure behind the piston 122 exceeds that behind the piston 123.

The operation of the apparatus can be explained, it is believed, by describing the hydraulic flow circuit and the pneumatic or air flow circuit. For that discussion, reference will be made to Figure 7 in particular. The hydraulic circuit is a closed system and includes a hydraulic storage tank or reservoir 99 that supplies pump 96, flow from which leads through a conduit 132 to the main control valve 68. As is most apparent from Figure 1, the conduit 132 comprises two sections 132a and 132b that at their point of juncture are connected to a by-pass 133, returning to the reservoir 99 through a pressure safety valve 134. The main control valve 68, as has been brought out before, is adapted to control the flow of high pressure hydraulic fluid to the lift cylinders 28, 29 and 30, and alternately to the downstroke cylinder 42. The valve is controlled by the control rod 67, and the position of the control rod is dependent upon the vertical position at any time of the lift cylinders 28 through 30 through the lever arm member 60 coupled therewith, and which has been described fully with reference to Figure 2.

The main control valve 68 has a lead 117 connected to one side of the cushion valve 101. Also connected with the main control valve is a conduit 135 that at its other end is connected with the hydraulic reservoir 99. The conduit 136 connects the control valve 68 with the downstroke cylinder 42, and lines 128 and 129 connect the control valve with opposite sides of the control cylinders for the cushion valve 101. Branching from the conduit 117 is a flow tube or conduit 137 that is connected with the lift cylinder 29. The lift cylinders or counter-balancing cylinders 28 and 30 are connected, respectively, by conduits 138 and 139 with conduit 113 that connects with the retard valve 100. Conduits 118 and 108 leading from the cushion valve 101 and retard valve 100, respectively, are connected to approximately the same point of a flow conduit 140 that then communicates with the lower end of the pump cylinder 81.

Air under pressure is supplied from a compressor (not shown) through inlet line 88 with the storage cylinder or expansion tank 87 which, through a smaller tank 85, conduits 86 and 84, is connected with the manifolds 82 and 83 whereby air under pressure is supplied to the upper ends of the air cylinders 70 through 73. As has been explained before, the expansion tank 87 may be provided with a safety release valve and a gauge, as well as a control valve at the inlet side of the tank.

In a cycle of operation, fluid is delivered from the pump 96 to the main control valve 68. When the valve rod 67 is in one of its alternate positions, the downstroke for example, the fluid pressure supplied to the control valve is fed therefrom through conduit 117 to the cushion valve 101. At this time, a portion of the hydraulic fluid passes through conduit 128 and into the lower cylinder 120 of the cushion valve, thereby moving the piston 122 thereof upwardly to open the valve 130 and permit a substantial quantity of hydraulic fluid to flow through the cushion valve, thence through the line 118 to the line 108, and from the line 108 to both the retard valve 100 and, through line 140, the bottom end of cylinder 81.

The retard valve 100 is arranged, as is evident from Figure 4, so that the pressure fluid flows relatively freely therethrough in one direction, overcoming the resistance of the weight valve 110, and is applied to the lift or balance cylinders 28 and 30 to drive the pistons thereof upwardly. The main control valve also supplies a flow of fluid to the conduit 137 which communicates with the flow conduit 117, wherein hydraulic fluid is fed to the bottom of the lift cylinder 29 to drive the piston thereof upwardly. The downstroke or return piston 42, however, through the conduit 136 is connected to the control valve 68, and the condition of the valve at this time in effect connects that flow conduit 136 with the return hydraulic conduit 135 so that upon upward movement of the pistons within the lift cylinders 28 through 30, fluid contained in the downstroke cylinder is driven therefrom and into the main control valve where it is either stored or coupled through the line 135 which connects with the hydraulic reservoir.

It will be appreciated that pressure fluid—both that supplied directly to the lift cylinder 29 and that supplied indirectly to the balance cylinders 28 and 30—is effective to drive the pistons thereof upwardly, wherein the cross arm 20 is elevated to lift the pump rod 10. During this operation, the fluid contained within the downstroke cylinder 42 is fed through the control valve 68 to the reservoir for the hydraulic fluid.

Because the conduit 137 for the lift cylinder 29 in effect is a by-pass about the cushion valve 101, but is connected directly thereto through the flow conduit 117, a portion of the hydraulic fluid moving through the valve 101 and into the conduit 118 will be forced through the conduit 140 to the lower end of the cylinder 81. The piston thereof will be moved upwardly, which in turn will drive upwardly the pistons of the cylinders 70 through 73. The volume of each of the latter cylinders being thereby reduced, the air or gaseous fluid contained therein will be pushed therefrom and into the chamber 85, and if necessary back to the air tank 87. When the cross arm 20 is in its uppermost position, and through the arm 60 thereof, the control rod 67 of the main control valve will be elevated, thereby changing the condition of the control valve. At this time, hydraulic pressure fluid will be fed directly from the inlet line 132 through the conduit 136 and to the upper end of the downstroke cylinder 42. The piston thereof will then commence to move downwardly. The main control valve will also be then conditioned to feed hydraulic fluid to the line 129 whereby the piston 123 of the valve cylinder (Fig. 5) will be driven downwardly to close off the cushion valve 130, as is shown in Figure 5. The cushion valve 130 being closed, hydraulic fluid cannot flow therethrough in the reverse direction. The result is that as the downstroke piston 43 moves downwardly, the fluid fed to the counter-balancing cylinders 28 and 30 will be forced therefrom through the retard valve 100. However, as is most evident from Figure 4, the flow of fluid in this direction is sharply curtailed, for all of the fluid is metered through the needle valve 106. This metering of the fluid necessitates a positive downward force exerted by the downstroke cylinder 42 against the cross arm 20. That arm moves downwardly, forcing the pistons within the counter-balancing cylinders 28 and 30 to move downwardly, but at a slow rate because the flow of fluid from those cylinders is limited by the retard valve. The main control valve 67 directly connects the lift cylinder 29 and its conduit 137 with the flow conduit 135, which is in communication with the hydraulic fluid reservoir 99.

Thus, first pressure fluid is fed through the main control valve 68 to the lift cylinders 28 through 30 to elevate the cross arm 20 and the pump rod 10 coupled thereto through the pulley arrangement. Thereafter, because of a changed position in the control rod 67 of the main control valve, fluid is exhausted from those cylinders at a relatively slow rate while the hydraulic pressure fluid is applied to the downstroke cylinder to cause the cross arm 20 to move downwardly. The downward motion of the arm 20 continues until the control rod 67 of the main control valve has been shifted to its alternate position wherein the cycle is again reversed.

When a portion of the hydraulic pressure fluid is fed to the cylinder 81 (because of a tendency of the pressure within the system to rise due to the initial inertia of the pump rod, etc., which resists the flow thereof), the piston therein moves upwardly, as do the pistons within the air cushion 69. These pistons force the air thereabove back into the chamber 85 and main air tank 87, gradually compressing the air therein, and, consequently, increasing the air pressure. When the force of the hydraulic fluid exerted against the piston of the cylinder 81 is gradually diminished to normal from such rise thereof as the inertia of the pump rod, etc., is overcome, the compressed air in the tank 87, tank 85 and in the upper ends of the air cushion cylinders 70 through 73 expands to return to its initial pressure, thereby forcing the piston within the cylinder 81 downwardly whereby energy is stored in the form of air compression is fed back into the hydraulic system through the line 140.

The air cushion 69 comes into play when the pump rod 10 is at the bottom of its stroke and when the control valve 68 has been conditioned so that pressure fluid is applied to the lift cylinders 28, 29 and 30. At this instant, the pump rod presents considerable inertia and offers a substantial resistance to movement. Therefore, the force applied thereto in a direction to elevate the same is a progressively increasing force because a portion of the hydraulic pressure fluid is absorbed in the air cushion. Therefore, the commencement of the upward motion of the pump rod is smooth and gradual. This motion is one of continuous acceleration, however, for a substantial portion of the stroke, for once upward movement is initiated the air cushion feeds energy back into the system, with the result that a greater pressure is developed within each of the lift cylinders 28, 29 and 30 than would be present if only the pressure supplied by the pump 96 were powering the system.

Referring now to Figure 6, reciprocation of the piston 80 within the cylinder 81 causes reciprocation of the piston within the cylinder 93 since that piston is tied to the piston 80 through the connector 78. Reciprocation of this piston draws air in through the check valve 94 on the upstroke, and forces it into the tank 85 on the downstroke thereof. The air drawn in is taken from the lower ends of the cushion cylinders 70 through 73 since the check valve communicates with the lower ends of those cylinders through conduits 141. The purpose of this arrangement is to save whatever lubricating fluid drains to the lower ends of the cushion cylinders, and to return it to the tank 85. Preferably, at least some of the volume of the air cushion cylinders 70 through 73 above the reciprocatory pistons thereof is filled with a lubricating oil. When the cushion pistons are in their lowermost position, the oil is all contained within the cushion cylinders. On the other hand, when the pistons are reciprocated upwardly, the oil is forced therefrom and into the tank 85. That tank should have a volume sufficiently large to receive all of the oil within the cushion cylinders so that none of the oil is passed into the air tank 87.

There are a number of advantages that accrue from maintaining the cylinders relatively short in length, such as for example, keeping to a minimum the difficulties encountered in providing bearing supports for the pistons of those cylinders which, it is appreciated, must lift a heavy load. Further, cylinders that are short may be made less expensively, and the problems of structural strength, which are magnified when cylinder length is increased, are obviated. However, it will be apparent that it is often necessary to reciprocate a pump rod through a considerable distance, and if this is to be accomplished while employing short lift cylinders, some means must be provided for multiplying at the pump rod the distance through which the pistons of the relatively short cylinders reciprocate. In the form of the invention heretofore described, a multiplication of two is provided at the pump rod 10 so that this pump rod moves through a distance twice that through which the pistons of the hydraulic power cylinders reciprocate. The distance multiplication appearing at the reciprocatory pump rod may be that imposed by the requirements of the pump with which the apparatus is employed. That is to say, the multiplication factor may be 2, 4, 6, 8, etc.; and in the form of the structure illustrated in Figure 8, an arrangement providing a distance multiplication of four is illustrated.

In this modified form of structure, support beams 142 that are comparable to the support beams 27 set forth in the description of the embodiment of the apparatus illustrated in Figures 1 through 7, are provided. Pivotally carried on the beams 142 in bifurcated support members 143 is a derrick 144 having at its upper end a rotatably mounted sheave 145. The derrick 144 may shift from right to left about the pivotal axis thereof, as viewed in Figure 8, and its precise position is determined by the setting of a turn buckle 146 that connects a rod 147 affixed to the derrick and a rod 148 that is rigidly secured to the standards 149 that are spaced apart, and at their lower ends have an enlarged space therebetween. The lower ends of the standards are rigidly secured to a support 150 that in turn is rigidly secured to an upright 151 rigidly affixed through a support 152 to the beams 142. Further support is provided for the standards 149 by an angular support member 153 that is welded or otherwise permanently joined to an L-shaped channel 154 at its lower end that extends between and that is secured to the support beams 142. Adjacent the upper ends of the standards, a reinforcing strap 155 is secured thereto, and the strap extends downwardly and angularly therefrom, and at its lower end is adapted to be rigidly secured to the support beams 142.

The well casing (which is shown at the left of Figure 8) is designated with the numeral 156, and is provided with a reciprocatory pump rod 157 that through a coupling 158 is attached to a cable 159 that is entrained over the sheave 145 at the upper end of the derrick. This cable also is drawn over a rotatable pulley wheel or sheave 160 at the upper end of a vertical support 161, that at its lower end is secured to a mounting member 162 affixed to the beams 142. The cable then passes over a pair of pulley wheels 163 and 164 that are rotatably mounted, respectively, at opposite ends of a movable beam 165 that extends horizontally and in generally parallel relation with the beams 142. From the pulley wheel 164, the cable extends downwardly and passes under pulley wheels 166 and 167 that are rotatably mounted upon a support member 150. Thereafter, the cable is drawn upwardly and over a rotatable sheave 168 carried by a mounting bar 169 secured to the standards 149. Then, the cable is drawn downwardly, and at its lower end is affixed to a coupling member 170 that is rigidly secured by a nut 171 or by other suitable means to the beams 142.

In this form of the structure, the lift or upstroke cylinders are supported upon a plate 172 that extends between and is affixed to the spaced beams 142. These cylinders are in line with each other, as in the form of the invention heretofore described; and in the illustration of Figure 8, the main lift cylinder is seen and is designated with the numeral 173, and one of the counterbalancing cylinders is also apparent and is designated with the numeral 174. These cylinders have reciprocatory pistons with rods 175 and 176 that at their upper ends are rigidly secured to the horizontal beam 165. Therefore, as the pistons within these cylinders move upwardly, the beam 165 moves upwardly whereby the well rod 157 is forced upwardly.

The downstroke cylinder arrangement is slightly varied from that shown and described with respect to the first embodiment in that a pair of downstroke cylinders rather than one are provided, and these are designated with the numerals 177 and 178 (as shown in Figure 7, the cylinder 177 corresponds to the cylinder 42 heretofore described, and the cylinder 178 is shown in dotted lines to distinguish the hydraulic flow circuit from that of the prior described form). These cylinders at their upper ends are rigidly affixed to a horizontal support member 179 that in turn is welded or otherwise secured to the stationary standards 149. Each of these downstroke cylinders is provided with a reciprocatory piston having, respectively, rods 180 and 181—the first being secured to a strap 182, and the second secured to a similar strap 183. The straps in turn are carried by the horizontal beam 165. It should be appreciated that the lift and counter-balancing cylinders shown in the form of the invention illustrated in Figure 8 provide the same function and work in the same manner as the cylinders 28, 29 and 30, and that the two downstroke cylinders 177 and 178 work in the same manner as the downstroke cylinder 42 heretofore described. A pair of downstroke cylinders are used in this form of the invention for they provide greater balance and tend to stabilize the movable beam 165 so that torque thereon is minimized.

In operation of this apparatus, the downstroke cylinders 177 and 178 have the fluid pressure therein released when the pistons of the upstroke and counter-balancing cylinders are energized. Thus, the beam 165 moved upwardly toward the support member 179 which is stationary and is spaced thereabove. This movement of the beam 165 increases the spacing between the pulley wheels 164 and 166, and 160 and 163. The arrangement is such that this change in spacing will cause the cable 159 to move twice the distance that the beam 165 traverses. In addition, the cable 159 being entrained over the pulley wheel 145 at the top of the derrick, must also then move at this point twice the distance of movement of the beam 165 so that, in all, the extent of movement of the well rod 157 is four times that of the movement of the beam 165, and then, the movement of the pistons driving it. Another advantage to the form shown in Figure 8 is that the members 47, 50 and 51 shown in Figure 1 are eliminated as well as the chain entrained thereover; the elimination of the latter and the chances of breakage thereof being a safety feature.

The system described has a number of advantages, most of which have been brought out hereinbefore; and as a very brief résumé, reference may be made to the feature wherein a force of gradually increasing magnitude is applied to a pump rod to elevate the same, whereby the tendencies of elongating the pump rod, tearing the foot valve or pump packings loose, etc. are obviated. However, though the initial movement of the pump rod is relatively slow because a portion of the hydraulic pressure is absorbed in the air cushion, all of this absorbed power is fed back into the system, with the result that the pump rod accelerates through a substantial extent of its upward movement, and when it reaches the top of its path of travel, does in fact decelerate as the energy in the cushion is consumed. The pump rod is not permitted to drop of its own weight, but instead is moved downwardly by a positive force exerted thereagainst by the downstroke cylinder. In the event that the hydraulic system should fail, the retard valve 100 prevents the pump rod from dropping, and instead permits it to go down quite slowly.

The speed of the downstroke of the pump rod 10 can be selectively varied by simple adjustment of the needle valve 106 which is equipped with a handle 107 for that purpose (see Fig. 4). If the needle valve is turned toward open position, hydraulic pressure fluid can flow from the conduit 113 to the conduit 108 within a shorter period of time than when the needle valve is moved toward closed position. Thus, if pressure fluid within the counter-balancing cylinders 28 and 30 is permitted to escape therefrom more quickly, the downstroke speed will thereby be increased. This adjustment enables the apparatus to be tailored to fit the capacity of any given well.

In prior art devices, the stroke length has been sharply limited, while in the apparatus herein invented the stroke length may be increased as much as desired. A greater stroke length is advantageous for a number of reasons, one of these being that the reciprocatory speed of the pump rod may be slowed down without loss of efficiency. On the other hand, it is not a requisite of this apparatus that the speed of the stroke be decreased as the well depth increases, and effective and efficient operations coupled with greatly superior results over available apparatus, has been attained when the speed of the stroke is increased (in certain instances, to greater than twice that which can be accommodated in available apparatus), and this increase in speed is attained with no increase in power consumption.

The cushion is not only effective to prevent the tearing of pump rods and the associated equipment, as has been brought out, but increases the upstroke speed tremendously, for the fluid forced into the cushion at the initiation of a change in reciprocatory direction of the pump rod is fed back into the system and into the lift cylinders, and this fluid then supplements that provided by the pump, whereby greater power initially drives the pistons of the lift cylinders upwardly. Thus, there is a conservation of the energy taken up by the cushion, for that energy is returned to the system and increases the speed of the stroke of the pump rod. This energy feedback, however, is dissipated before the pump rod reaches the upper limits of its reciprocatory movement so that there is a progressive slowing down of the velocity of the pump rod in that direction adjacent the top of its stroke. The increase in speed of pump rod movement is in itself representative of an increase in the efficiency of the pump apparatus, and it should also be kept in mind that the increase in speed of movement of the rod increases the amount of liquid raised by the pump, for there is some leakage within any pump, and such leakage is a function of time—that is, the time in which it takes to move the pump rod from its lowermost to its uppermost position.

Another advantage that accrues both from the exceptionally long stroke provided by my apparatus and also from the speed with which the pump rod is moved, is that of preventing sand and other solid particulate material from accumulating within the casing of the pump assembly. It will be appreciated that as the pump rod is reciprocated to pump liquids from the depths of a well, considerable sand will be drawn upwardly with the liquid. The sand has a tendency to settle and accumulate between the casing and pump rod, thereby impeding the free flow or free pumping of liquid therethrough. With the long stroke which I provide, however, the sand as well as the liquid is moved upwardly a considerable distance, and does not have time to settle before the initiation of the second upstroke. Further, the rapidity with which the pump rod is reciprocated obviates any tendency of the sand to settle between strokes of the rod.

While in the foregoing specification embodiments of the invention have been set forth in considerable detail for purposes of illustration, it will be apparent to those skilled in the art that numerous changes may be made in those details without departing from the spirit and principles of the invention.

I claim:

1. In a hydraulic system, a work element adapted to be reciprocated in the performance of a useful function, a lift cylinder equipped with a reciprocable piston connected with said work element for moving the same in one direction, a counter-balance cylinder equipped with a reciprocable piston also connected with said work element for applying a biasing force thereto tending to move the same in the aforesaid one direction, a return cylinder equipped with a reciprocable piston connected with said work element for moving the same in the opposite direction, a hydraulic circuit for said cylinders and including a pump for supplying fluid under pressure thereto, control valve means in said circuit for selectively connecting said return cylinder or said lift and counter-balance cylinders to the pressure side of said pump and at the same time connecting the other thereof to the return side of the pump, uni-directional valve means interposed in said circuit between said counter-balance cylinder and said control valve means at a location such that fluid flowing between said lift cylinder and control valve means does not pass therethrough, and an energy storage and release cushion connected in said circuit intermediate said uni-directional valve means and counter-balance cylinder, said uni-directional valve means being effective to prevent the flow of fluid from said counter-balance cylinder to the return side of said pump and to direct such fluid into said cushion when said lift cylinder is connected to the return side of said pump and to permit energy excesses to be stored by said cushion when said lift and counter-balance cylinders are connected to the pressure side of said pump.

2. The system of claim 1 in which said energy storage and release cushion comprises piston and cylinder structure and a gaseous fluid compressed thereby in the storage of energy from said circuit.

3. The system claim 1 in which said cushion comprises a cushion cylinder having a piston reciprocable therein, and air pressure means for biasing the cushion piston in one axial direction, the connection of said cushion cylinder with said circuit causing a force to be applied against the cushion piston urging the same in an axial direction opposed to the aforesaid one axial direction during the storage of energy by said cushion.

4. The system of claim 1 in which said uni-directional valve means comprises a casing having a pair of flow passages therein, a valve port establishing open communication between said passages intermediate the ends thereof, a valve for controlling the flow of fluid through said valve port, and a pair of opposed cylinders each equipped with a piston reciprocable therein, said last mentioned pistons being opposed to each other and each being coupled with said valve so that the positon thereof is dependent upon the pressures within the cylinders therefor, each of said opposed cylinders being connected to said control valve means so as to be selectively supplied with pressure fluid therefrom to close said valve port when said lift cylinder is connected to the return side of said pump and for opening said valve port when said lift and counter-balance cylinders are connected to the pressure side of said pump.

5. The system of claim 1 in which a retard valve is interposed in said circuit intermediate said counter-balance cylinder and the point of connection of said cushion and the circuit, said retard valve being characterized by permitting the free flow of fluid to said counter-balance cylinder but metering the flow of fluid from the counter-balance cylinder to said cushion.

6. The system of claim 5 in which said retard valve comprises a casing provided with a pair of flow passages therein, a check valve providing communication between said passages to permit flow of fluid to said counter-balance cylinder but prevent the return flow therefrom, and a needle valve establishing communication between said passages in parallel relation with said check valve for limiting the rate of flow of fluid therebetween to restrict the fluid flow in the direction from said counter-balance cylinder.

7. In a hydraulic system, a lift cylinder, a return cylinder and a counter-balance cylinder each equipped with a piston reciprocable therein for connection with a work element to reciprocate the same through a cycle of operation, a hydraulic circuit for said cylinders and having a pressure side and a return side, a control valve for selectively connecting the return cylinder to the pressure side of said circuit and the lift cylinder to the return side of said circuit or for connecting the return cylinder to the return side of said circuit and the lift and counter-balance cylinders to the pressure side of said circuit, uni-directional valve means interposed in said circuit between said counter-balance cylinder and said control valve means at a location such that fluid flowing between said lift cylinder and control valve means does not pass therethrough, and an energy storage and release cushion connected in said circuit intermediate said uni-directional valve means and counter-balance cylinder, said uni-directional valve being operative to permit the flow of fluid from the pressure side of said circuit to said counter-balance cylinder but to prevent the return flow of fluid therefrom and to direct it into said cushion.

8. In a hydraulic system, a lift cylinder, a return cylinder and a counter-balance cylinder each equipped with a piston reciprocable therein for connection with a work element to reciprocate the same through a cycle of operation, a hydraulic circuit for said cylinders and having a pressure side and a return side, a control valve for selectively connecting the return cylinder to the pressure side of said circuit and the lift cylinder to the return side of said circuit or for connecting the return cylinder to the return side of said circuit and the lift and counterbalance cylinders to the pressure side of said circuit, an energy storage and release cushion connected to said circuit adjacent said counterbalance cylinder, and a retard valve interposed in said circuit adjacent said counter-balance cylinder and being operative to permit the free flow of pressure fluid thereto but restricting the flow of fluid therefrom.

References Cited in the file of this patent

UNITED STATES PATENTS

| | | |
|---|---|---|
| 180,495 | Perkins | Aug. 1, 1876 |
| 1,596,145 | Black | Aug. 17, 1926 |
| 1,619,474 | Hubbard | Mar. 1, 1927 |
| 1,905,133 | Bishop et al. | Apr. 25, 1933 |
| 2,170,890 | Allen | Apr. 29, 1939 |
| 2,232,449 | Habenicht | Feb. 18, 1941 |
| 2,264,375 | Hill et al. | Dec. 2, 1941 |
| 2,282,977 | Mast | May 12, 1942 |
| 2,403,391 | Muir | July 2, 1946 |
| 2,495,785 | Stephens | Jan. 31, 1950 |
| 2,555,427 | Trautman | June 5, 1951 |
| 2,560,285 | Habenicht | July 10, 1951 |
| 2,564,285 | Smith | Aug. 14, 1951 |
| 2,572,748 | Noll et al. | Oct. 23, 1951 |